(12) United States Patent
Fujisawa

(10) Patent No.: US 11,400,588 B2
(45) Date of Patent: Aug. 2, 2022

(54) ROBOT CONTROL APPARATUS AND ROBOT CONTROL SYSTEM

(71) Applicant: DAIHEN Corporation, Osaka (JP)

(72) Inventor: Sho Fujisawa, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 96 days.

(21) Appl. No.: 16/946,358

(22) Filed: Jun. 18, 2020

(65) Prior Publication Data

US 2020/0398421 A1    Dec. 24, 2020

(30) Foreign Application Priority Data

Jun. 18, 2019    (JP) .............................. JP2019-112799

(51) Int. Cl.
*B25J 19/02* (2006.01)
*B25J 9/16* (2006.01)
*B25J 9/00* (2006.01)

(52) U.S. Cl.
CPC .............. *B25J 9/161* (2013.01); *B25J 9/0081* (2013.01); *B25J 19/022* (2013.01)

(58) Field of Classification Search
CPC ........ B25J 9/161; B25J 19/022; B25J 9/0081; B25J 9/1684; G05B 19/408;
(Continued)

(56) References Cited

U.S. PATENT DOCUMENTS

| | | | | |
|---|---|---|---|---|
| 4,831,316 A | * | 5/1989 | Ishiguro | G05B 19/425 318/573 |
| 4,954,762 A | * | 9/1990 | Miyake | G05B 19/4182 318/568.19 |

(Continued)

FOREIGN PATENT DOCUMENTS

| | | |
|---|---|---|
| EP | 3 437 810 A1 | 2/2019 |
| JP | 2004-42118 A | 2/2004 |

OTHER PUBLICATIONS

Mizukawa et al., Multi-modal information-sharing teaching system in sensor-based robotics $structured description based on task properties that enables onsite-tuning by reflecting skills, 2002, IEEE, p. 1535-1540 (Year: 2002).*
Stachowicz et al., Episodic-Like Memory for Cognitive Robots, 2011, IEEE, p. 1-16 (Year: 2011).*
Kulakov et al., Intelligent method of robots teaching by show, 2013, IEEE, p. 935-940 (Year: 2013).*
Kuniyoshi et al., Learning by watching: extracting reusable task knowledge from visual observation of human performance, IEEE, 1994, IEEE, p. 799-822 (Year: 1994).*

(Continued)

*Primary Examiner* — McDieunel Marc
(74) *Attorney, Agent, or Firm* — Troutman Pepper Hamilton Sanders LLP

(57) ABSTRACT

A memory in which information that is used in a tracking operation is to be temporarily stored, information cannot be accumulated in the memory when the accumulating intervals and the reading intervals do not match each other. A robot control apparatus includes: a memory; an accepting unit that accepts a sensing result of a laser sensor detecting a shape of a working target before an, and accumulates information according to the sensing result, in the memory. The memory management unit that, in a case in which the memory is running short of free space, deletes the information in the memory; and a control unit that moves the working tool based on teaching data, and corrects the movement of the working tool based on the information according to the sensing result stored in the memory.

5 Claims, 7 Drawing Sheets

(58) Field of Classification Search
CPC ........... G05B 2219/45104; G05B 2219/36415; G05B 2219/40536
See application file for complete search history.

(56) References Cited

U.S. PATENT DOCUMENTS

| | | | | |
|---|---|---|---|---|
| 5,006,999 | A | * | 4/1991 | Kuno .................... G05B 19/425 219/124.34 |
| 5,467,003 | A | | 11/1995 | Kosala et al. |
| 6,023,044 | A | | 2/2000 | Kosaka et al. |
| 9,505,128 | B1 | * | 11/2016 | Kesil ........................ B25J 9/163 |
| 2005/0107918 | A1 | * | 5/2005 | Watanabe ............... B25J 9/1684 700/245 |
| 2007/0145027 | A1 | | 6/2007 | Izawa et al. |
| 2011/0238215 | A1 | * | 9/2011 | Yanagawa ............... G05B 19/42 700/258 |
| 2016/0346923 | A1 | * | 12/2016 | Kesil ....................... B25J 9/1612 |
| 2017/0090431 | A1 | | 3/2017 | Komatsu et al. |
| 2020/0398425 | A1 | * | 12/2020 | Fujisawa .................. B23K 9/16 |

OTHER PUBLICATIONS

Matsui et al., Slit laser sensor guided real-time seam tracking arc welding robot system for non-uniform joint gaps, 2002, IEEE, p. 159-162 (Year: 2002).*
Kang et al., Study on Robot Application Technology for Laser Welding, 2008, IEEE, p. 354-356 (Year: 2008).*
Kang et al., Laser vision system for automatic seam tracking of stainless steel pipe welding machine (ICCAS 2007), 2007, IEEE, p. 1046-1051 (Year: 2007).*
Shi et al., Adaptive Robotic Welding System Using Laser Vision Sensing for Underwater Engineering, 2007, IEEE, p. 1213-1218 (Year: 2007).*
Extended European Search Report issued in corresponding European Patent Application No. 20 17 9937 dated Nov. 13, 2020.
European Office Action for corresponding European Application No. 20179937.6 dated May 16, 2022.

* cited by examiner

|                                  | State of memory | Number of pieces of information that can be stored |
|---|---|---|
| State 1 (initial state) | □ □ □ □ □ □ □ □ □ □ | 10 |
| State 2 (memory full) | ■ ■ ■ ■ ■ ■ ■ ■ ■ ■ | 0 |
| State 3 (reduced to half) | ■ □ ■ □ ■ □ ■ □ ■ □ | 5 |
| State 4 (memory re-arranged) | ■ ■ ■ ■ ■ □ □ □ □ □ | 5 |
| State 5 (information accumulated) | ■ ■ ■ ■ ■ ■ □ □ □ □ | 4 |

□ : Data not stored
■ : Data stored

FIG.4

| | State of memory | Number of pieces of information that can be stored |
|---|---|---|
| State 1 (initial state) | ☐ ☐ ☐ ☐ ☐ ☐ ☐ ☐ ☐ ☐ | 10 |
| State 2 (memory full) | ■ ■ ■ ■ ■ ■ ■ ■ ■ ■<br>72 26 31 60 99 81 53 74 66 15 | 0 |
| State 3 (information deleted) | ■ ■ ■ ■ ☐ ■ ■ ■ ■ ■<br>72 26 31 60    81 53 74 66 15 | 1 |
| State 4 (memory re-arranged) | ■ ■ ■ ■ ■ ■ ■ ■ ■ ☐<br>72 26 31 60 81 53 74 66 15 | 1 |
| State 5 (information accumulated) | ■ ■ ■ ■ ■ ■ ■ ■ ■ ■<br>72 26 31 60 81 53 74 66 15 30 | 0 |

☐ : Data not stored
■ : Data stored

FIG.7

ROBOT CONTROL APPARATUS AND ROBOT CONTROL SYSTEM

CROSS REFERENCE TO RELATED APPLICATION

This application claims priority of Japanese Patent Application No. 2019-112799 filed Jun. 18, 2019. The entire contents of which are hereby incorporated by reference.

FIELD OF THE INVENTION

The present invention relates to a robot control apparatus and the like for moving a working tool based on a sensing result of a laser sensor.

BACKGROUND OF THE INVENTION

When performing welding using robots, target positions may be displaced due to heat strain of workpieces, which results in welding defects. This displacement is solved by detecting a joint position with a laser sensor and adjusting a target position of a robot (welding seam tracking) (see JP 2004-042118A, for example).

SUMMARY OF THE INVENTION

When performing tracking operations such as welding seam tracking, information according to sensing performed very often by laser sensors are held in memories, and tracking operations are performed using the information held in the memories. The information in the memories has to be held until working tools reach the positions according to the information. Thus, it is necessary to prevent the memory capacity from being insufficient, by adjusting the intervals for accumulating information in the memories, but there is a problem in that it is very complicated to manually perform such adjustment. On the other hand, if such adjustment is not performed, when accumulating information according to sensing, there is a problem in that the information cannot be accumulated due to lack of free space in the memories.

The present invention was made in order to solve the above-described problems, and it is an object thereof to provide a robot control apparatus and the like capable of, when performing control for moving a working tool based on a sensing result of a laser sensor, preventing a situation in which information according to a sensing result cannot be accumulated in a memory.

In order to achieve the above-described object, the present invention is directed to a robot control apparatus including: a storage unit in which teaching data is stored; a memory; an accepting unit that accepts a sensing result of a laser sensor, from a robot including a working tool and the laser sensor configured to detect a shape of a working target before an operation of the working tool, and accumulates information according to the sensing result, in the memory; a memory management unit that, in a case in which the memory is running short of free space, deletes the information according to the sensing result stored in the memory; and a control unit that moves the working tool based on the teaching data, and corrects the movement of the working tool based on the information according to the sensing result stored in the memory.

With this configuration, information according to the sensing result stored in the memory is deleted as appropriate, and thus it is possible to prevent a situation in which information according to a sensing result cannot be accumulated in the memory. Furthermore, it is not necessary to manually adjust intervals for accumulating information in a memory in order to prevent the memory capacity from being insufficient, resulting in an advantage that complicated adjustment operations do not have to be performed.

Furthermore, the robot control apparatus according to the present invention may have a configuration in which, in a case in which the memory is running short of free space, the memory management unit reduces the information according to the sensing result stored in the memory and makes intervals for accumulating the information according to the sensing result in the memory longer.

With this configuration, it is possible to prevent a situation in which information according to a sensing result cannot be accumulated in the memory, and to prevent a situation in which the memory capacity becomes insufficient, by automatically changing the intervals for accumulating information in the memory.

Furthermore, the robot control apparatus according to the present invention may have a configuration in which, in a case in which the memory is running short of free space, the memory management unit reduces the information according to the sensing result stored in the memory to ½, and doubles a length of the intervals for accumulating the information according to the sensing result in the memory.

With this configuration, after information is reduced, it is possible to make the intervals of information stored in the memory match the intervals of information newly accumulated in the memory.

Furthermore, the robot control apparatus according to the present invention may have a configuration in which the accepting unit accumulates a dispersion level indicating a level of dispersion of differences between a shape of the working target estimated based on the sensing result, and the sensing result, in the memory in association with the information according to the sensing result, and, in a case in which the memory is running short of free space, the memory management unit deletes information according to a sensing result associated with a highest dispersion level, out of the information according to sensing results stored in the memory.

With this configuration, it is possible to limit the information that is to be deleted from the memory, to information with low reliability. Accordingly, it is possible to prevent the level of precision of the tracking operation from being lowered by deleting information in the memory.

Furthermore, the present invention is directed to a robot control system including the robot control apparatus, and the robot that is controlled by the robot control apparatus.

With the robot control apparatus and the like according to the present invention, it is possible to prevent a situation in which information according to a sensing result cannot be accumulated in a memory.

BRIEF DESCRIPTION OF THE DRAWINGS

FIG. 4 is a diagram illustrating an example of the processing of deleting information in the memory according to the embodiment.

FIG. 7 is a diagram illustrating an example of the processing of deleting information in the memory according to the embodiment.

DETAILED DESCRIPTION OF THE INVENTION

Figure 1:
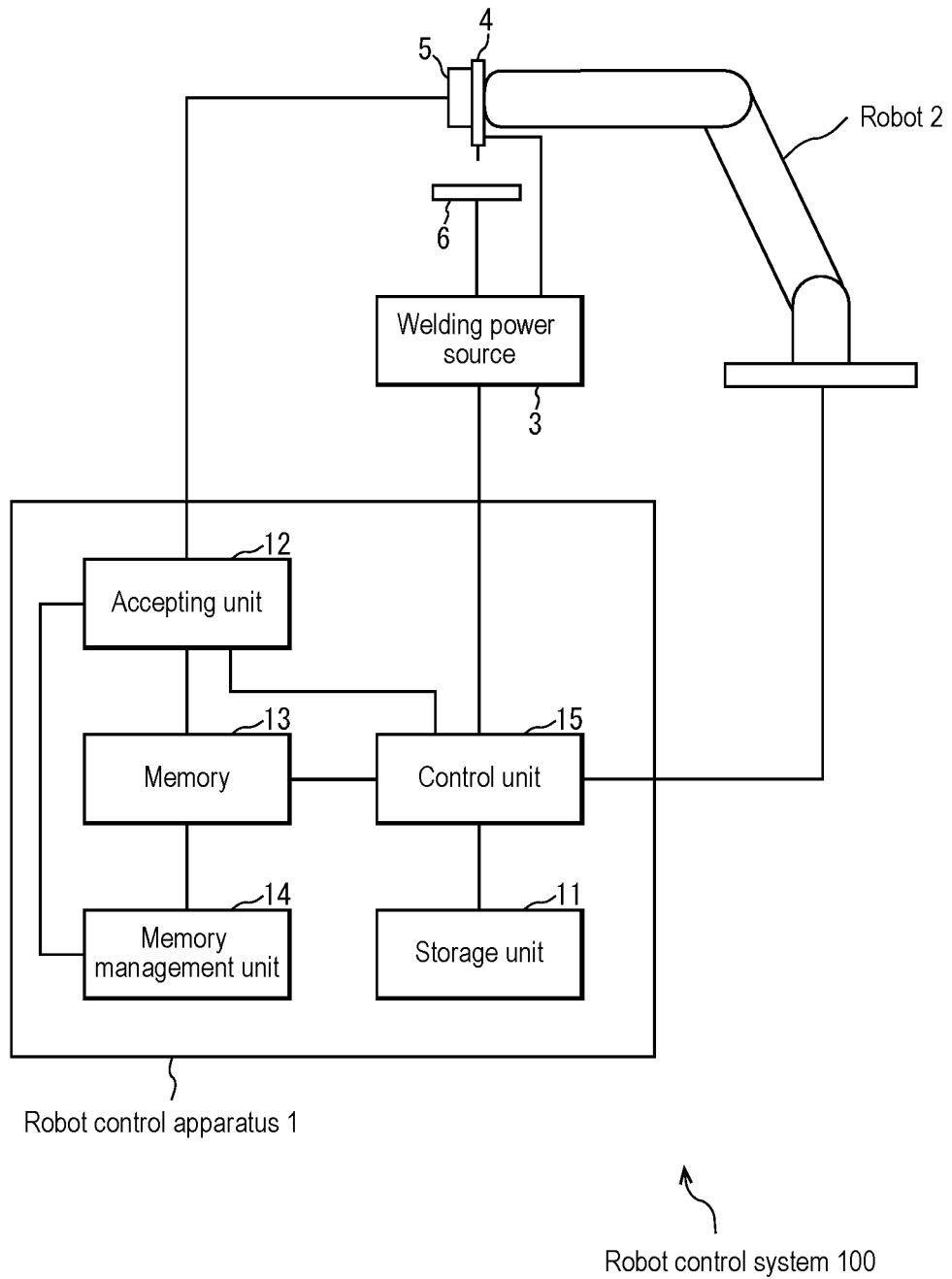
FIG. 1 is a schematic diagram showing the configuration of a robot control apparatus according to an embodiment of the present invention.

Hereinafter, a robot control system and a robot control apparatus according to the present invention will be described based on an embodiment. Note that constituent elements or steps denoted by the same reference numerals are the same as or similar to each other in the following embodiments, and thus a description thereof may not be repeated. In a case in which a memory where information according to a sensing result is to be accumulated is running short of free space, the robot control apparatus according to this embodiment deletes information in the memory.

FIG. 1 is a block diagram showing the configuration of a robot control system 100 according to this embodiment. The robot control system 100 according to this embodiment includes a robot control apparatus 1, a robot 2, and a welding power source 3.

The robot control apparatus 1 controls the robot 2 and the welding power source 3. The robot 2 has a manipulator having multiple arms coupled to each other via joints that are driven by a motor, and an end of the manipulator has a working tool 4 and a laser sensor 5 that detects the shape of a working target (workpiece) 6 before an operation of the working tool 4. There is no particular limitation on the robot 2, but examples thereof may include a vertical articulated robot. The laser sensor 5 may be a laser sensor that irradiates the working target 6 with a linear laser beam and captures the laser beam, thereby measuring the distance along multiple sampling points to the working target 6. The laser sensor 5 may be a scanning laser sensor that performs scanning in a linear manner, thereby measuring the distance along multiple sampling points to the working target 6. With the laser sensor 5, for example, it is possible to acquire the shape of a welding point such as a groove. In this embodiment, a case will be mainly described in which the working tool 4 is a welding torch, and an operation that is performed with the working tool 4 is welding. The configuration of the robot 2 including the working tool 4 and the laser sensor 5 is already known, and thus a detailed description thereof has been omitted.

The welding power source 3 supplies a high voltage that is used in welding, to the working tool (welding torch) 4 and the workpiece 6. If a welding wire is used in welding, the welding power source 3 may perform control regarding supply of the welding wire. The configuration of the welding power source 3 is already known, and thus a detailed description thereof has been omitted.

The robot control apparatus 1 controls the robot 2 to perform a tracking operation based on a sensing result of the laser sensor 5. As shown in FIG. 1, the robot control apparatus 1 includes a storage unit 11, an accepting unit 12, a memory 13, a memory management unit 14, and a control unit 15.

Teaching data is stored in the storage unit 11. It is assumed that the teaching data indicates a movement path (e.g., a position, a posture, etc.) of the working tool 4 of the robot 2. The teaching data may also contain information regarding welding conditions such as a start point or an end point of welding, a welding current, a welding voltage, and the like.

There is no limitation on the procedure in which information is stored in the storage unit 11. For example, information may be stored in the storage unit 11 via a storage medium, information transmitted via a communication line or the like may be stored in the storage unit 11, or information input via an input device may be stored in the storage unit 11. For example, teaching data input using a teaching pendant or the like connected to the robot control apparatus 1 may be stored in the storage unit 11. In the storage unit 11, information may be temporarily stored in a RAM or the like, or may be stored for a long period of time. The storage unit 11 can be realized by any storage medium (e.g., a semiconductor memory, a magnetic disk, etc.).

The accepting unit 12 accepts a sensing result of the laser sensor 5 from the robot 2, and accumulates information according to the sensing result in the memory 13. The information that is accumulated in the memory 13 may be information at predetermined intervals. The sensing result of the laser sensor 5 may be, for example, distances in the height direction from multiple points of laser beams with which the working target 6 are irradiated (e.g., distances from the laser sensor 5 to the working target 6). The sensing result may be acquired by a two-dimensional or three-dimensional imaging sensor (e.g., a CCD array, etc.). The sensing result is typically information at multiple sampling points indicating the shape of the working target 6, and thus the accepting unit 12 may create the shape of the working target 6 from the sensing result, and acquire a position at which an operation is to be performed by the working tool 4, for example, a position of an operation line (welding seam), using the created shape. This position may be hereinafter referred to as a feature point position. For example, when welding a lap joint, the position of a step indicated by the sensing result is a feature point position. For example, when welding a butt joint, the position of a groove indicated by the sensing result is a feature point position.

Furthermore, since the sensing result indicates a position in a coordination system of the laser sensor 5, the accepting unit 12 may convert the position in the coordination system into a position in a predetermined reference coordination system. The reference coordination system may be, for example, the coordination system of the robot 2. Thus, the accepting unit 12 may accept the position and the posture in a reference coordination system of the working tool 4, from the control unit 15, and may acquire a feature point position in the reference coordination system using the accepted position and posture, and the sensing result. The information according to the sensing result that is accumulated in the memory 13 may be, for example, information indicating the feature point position in the reference coordination system, the sensing result itself, or other information according to the sensing result. In this embodiment, a case will be mainly described in which the information according to the sensing result is information indicating the feature point position in the reference coordination system.

The sensing result may be, for example, information acquired by the laser sensor 5 at predetermined intervals. Also, the intervals of information accumulated in the memory 13 may or may not match the intervals for acquiring the sensing results. In the case of the latter, for example, the accepting unit 12 may perform processing (down-sampling)

that decimates information after when a sensing result is accepted from the laser sensor 5 to when information according to the sensing result is accumulated in the memory 13. For example, if sensing results accepted from the laser sensor 5 are information at every 20 (ms), and the intervals of information accumulated in the memory 13 are 40 (ms), the accepting unit 12 may decimate sensing results accepted from the laser sensor 5 to half, acquire information indicating the feature point positions in the reference coordination system, and accumulate it in the memory 13.

Furthermore, as will be described later, the accepting unit 12 may accumulate a dispersion level indicating the level of dispersion of differences between the shape of the working target 6 estimated based on the sensing result, and the sensing result, in the memory 13 in association with the information according to the sensing result. There is no particular limitation on the dispersion level, but it may be, for example, variance, standard deviation, or the like. The dispersion level, the method for acquiring the dispersion level, and the like will be described later.

Information that is used in a tracking operation is temporarily stored in the memory 13. Specifically, as described above, information according to the sensing result is stored in the memory 13. As described above, a dispersion level in association with the information according to the sensing result may also be stored in the memory 13.

In a case in which the memory 13 is running short of free space, the memory management unit 14 deletes the information according to the sensing result stored in the memory 13. The information that is deleted is typically part of the information stored in the memory 13. In this embodiment, as the method for deleting information, a method (1) in which the memory management unit 14 reduces the information according to the sensing result stored in the memory 13, and makes the intervals for accumulating the information according to the sensing result in the memory 13 longer, and a method (2) in which the memory management unit 14 deletes information according to a sensing result associated with the highest dispersion level, out of the information according to sensing results stored in the memory 13 will be described later, but the memory management unit 14 may delete the information in the memory 13 using a method other than these methods.

There is no limitation on when the memory management unit 14 deletes the information in the memory 13. For example, the memory management unit 14 may delete the information in the memory 13 in a case in which there is no more free space in the memory 13. Also, the memory management unit 14 may delete the information in the memory 13 in a case in which the free space in the memory 13 becomes smaller than a predetermined threshold value. In this embodiment, a case will be mainly described in which the memory management unit 14 deletes the information in the memory 13 in response to a state in which there is no more free space in the memory 13.

Furthermore, there is no limitation on the amount of information that is deleted by the memory management unit 14 at one time. For example, in a case in which the memory 13 is running short of free space, the memory management unit 14 may delete one piece of information according to a sensing result (i.e., information regarding one feature point), or may delete two or more pieces of information according to sensing results (i.e., information regarding two or more feature points).

The control unit 15 moves the working tool 4 based on the teaching data stored in the storage unit 11, and corrects the movement of the working tool 4 based on the information according to the sensing result stored in the memory 13. In this manner, so-called tracking correction is performed. More specifically, the control unit 15 calculates a targeted position and a targeted posture of the working tool 4 based on the teaching data, before movement of the working tool 4. The targeted position and the targeted posture may be calculated, for example, through interpolation of a teaching position or a teaching posture contained in the teaching data. The calculated targeted position and targeted posture indicate information regarding movement of the working tool 4, that is, a time-series change in the position and the posture of the working tool 4. The control unit 15 calculates the current position and posture of the working tool 4, for example, based on the angle of each joint read from an encoder or the like of the manipulator of the robot 2. This information may be delivered to the accepting unit 12 as described above. The control unit 15 may read the information according to the sensing result from the memory 13, calculate a targeted position and a targeted posture of the working tool 4 according to the read information, and replace the targeted position and the targeted posture calculated from the teaching data with the targeted position and the targeted posture calculated from the information according to the sensing result. If it is difficult to perform movement from the current position and posture to the targeted position and the targeted posture calculated based on the information according to the sensing result (e.g., a change in the position or the posture is a change by a predetermined threshold value or more, etc.), a targeted position and a targeted posture between the targeted position and the targeted posture calculated based on the teaching data and the targeted position and the targeted posture calculated based on the information according to the sensing result may be newly created, and the targeted position and the targeted posture calculated based on the teaching data may be replaced with the newly created information. The control unit 15 may control the robot 2 such that the working tool 4 is at the targeted position and the targeted posture, using the current position and posture of the working tool 4 and the targeted position and the targeted posture. In this manner, the tracking correction is performed. It is also possible that the tracking correction is performed using method other than that described above, as long as tracking correction is eventually performed based on the sensing result. The tracking correction is already known, and thus a detailed description thereof has been omitted. If the control unit 15 reads the information according to the sensing result from the memory 13, the information may be deleted from the memory 13. If the dispersion level is also stored in association with the information, the control unit 15 may also delete the dispersion level as well from the memory 13. The control unit 15 may instruct the welding power source 3 to start or end welding, or may output welding conditions to the welding power source 3, based on the teaching data.

The storage unit 11 and the memory 13 are typically realized by different storage media, but there is no limitation to this. For example, a configuration is possible in which, in a storage medium, an area is used as the storage unit 11 and another area is used as the memory 13. Also in this case, if the memory management unit 14 performs management as in this embodiment, it is possible to perform control for preventing a situation in which information according to the sensing result cannot be accumulated in an area of the memory 13.

Next, an operation of the robot control apparatus 1 will be described with reference to the flowchart in FIG. 2.

(Step S101) The accepting unit 12 judges whether or not to accept a sensing result. If a sensing result is to be accepted, a sensing result from the laser sensor 5 is accepted and the procedure advances to step S102, and, if otherwise, the procedure advances to step S106. For example, if the information in the memory 13 is deleted according to the method (1), the accepting unit 12 may judge to accept a sensing result at every interval of information accumulated in the memory 13. For example, if the information in the memory 13 is deleted according to the method (2), the accepting unit 12 may judge to accept a sensing result at every interval at which the laser sensor 5 acquires a sensing result.

(Step S102) The accepting unit 12 acquires information according to the sensing result accepted from the laser sensor 5. This information may be, for example, information indicating the position of a feature point in the reference coordination system. If the information in the memory 13 is deleted according to the method (2), the accepting unit 12 may acquire a dispersion level according to the sensing results. The processing for acquiring the dispersion level will be described later.

(Step S103) The memory management unit 14 judges whether or not the memory 13 has enough free space in which new information can be accumulated. If the memory 13 has enough free space, the procedure advances to step S105, and, if otherwise, the procedure advances to step S104.

(Step S104) The memory management unit 14 deletes the information stored in the memory 13, thereby increasing the free space in the memory 13, so that information that is to be accumulated can be accumulated in the memory 13. The procedure advances to step S105. This processing will be described later in detail.

(Step S105) The accepting unit 12 accumulates the information acquired in step S102, in the memory 13. The procedure then returns to step S101. If a dispersion level according to the sensing results is also acquired in step S102, the accepting unit 12 may accumulate the dispersion level in the memory 13 in association with the information according to the sensing results.

(Step S106) The control unit 15 judges whether or not to move the working tool 4. If it moves the working tool 4, the procedure advances to step S107, and, if otherwise, the procedure then returns to step S101. For example, the control unit 15 may regularly judge to move the working tool 4.

(Step S107) The control unit 15 controls the movement of the working tool 4, based on the teaching data stored in the storage unit 11 and the information according to the sensing result stored in the memory 13. Through this control, the working tool 4 of the robot 2 is moved to the targeted position and the targeted posture. The control unit 15 may perform control regarding an operation of the working tool 4. Specifically, the control unit 15 may control the start and the end of welding, a welding voltage, a welding current, and the like, by controlling the welding power source 3. The procedure then returns to step S101. The series of operations on the working target 6 are performed by repeating the processing in steps S106 and S107.

Figure 2:
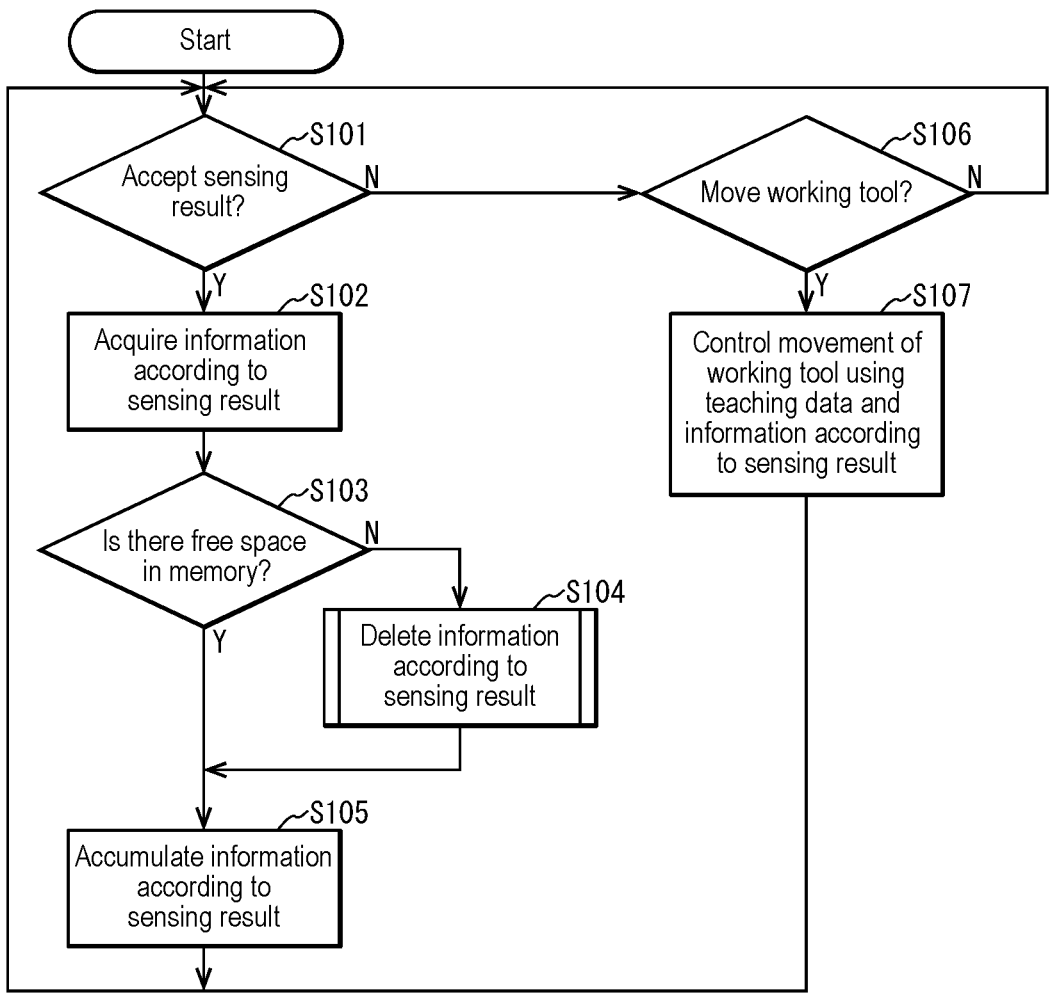
FIG. 2 is a flowchart showing an operation of the robot control apparatus according to the embodiment.

In the flowchart in FIG. 2, the processing ends at power off or at an interruption of ending processing. For example, when the series of operations by the working tool 4 are ended, the procedure in the flowchart in FIG. 2 may be ended.

Next, the processing that deletes the information (Step S104) in the flowchart in FIG. 2 will be described in each of the case (1) in which the memory management unit 14 reduces the information according to the sensing result stored in the memory 13, and makes the intervals for accumulating the information according to the sensing result in the memory 13 longer, and the case (2) in which the memory management unit 14 deletes information according to a sensing result associated with the highest dispersion level, out of the information according to sensing results stored in the memory 13.

Case (1) in which the Information in the Memory 13 is Deleted and the Intervals for Accumulating the Information is Made Longer In this case, the memory management unit 14 reduces the information according to the sensing result stored in the memory 13, and makes the intervals for accumulating the information according to the sensing result in the memory 13 longer. The information is deleted from the memory 13 in order to increase the free space in the memory 13, and thus there is no limitation on the number of pieces of information according to the sensing result that are to be deleted. It is sufficient that at least one or more pieces of information according to the sensing result are deleted. In the laser sensor 5, typically, the shortest imaging interval is determined. Accordingly, even when the intervals for accumulating information in the memory 13 is increased by a unit shorter than the imaging intervals, sensing cannot be performed at the intervals after the increase. Thus, as a result, information at the intervals after the increase cannot be accumulated in the memory 13. Accordingly, the memory management unit 14 may increase the intervals for accumulating information in the memory 13, in the unit of the imaging intervals. For example, if the imaging intervals of the laser sensor 5 are 20 (ms), the memory management unit 14 may increase the intervals for accumulating information in the memory 13, by M×20 (ms). Note that M is an integer of 1 or more. With this processing, the free space in the memory 13 can be increased, and the intervals for accumulating information in the memory 13 can be made longer. If there is no more free space in the memory 13 after the processing, this processing may be performed again. In this manner, the processing that increases the free space in the memory 13 and makes the intervals for accumulating information in the memory 13 longer is repeated, and thus, ultimately, accumulation of information in the memory 13 and reading of the information therefrom are balanced, and thus it is possible to prevent a situation in which the free space in the memory 13 becomes insufficient.

For example, the memory management unit 14 may reduce the information according to the sensing result stored in the memory 13 to 1/N, and make the intervals for accumulating information in the memory 13 to N times, according to reduction of the information. Note that N is an integer of 2 or more. For example, if N=2, in a case in which the memory 13 is running short of free space, the memory management unit 14 may reduce the information according to the sensing result stored in the memory 13 to ½, and double the length of the intervals for accumulating the information according to the sensing result in the memory 13. If the information in the memory 13 is reduced to 1/N, and the intervals for accumulating is made N times in this manner, the information stored in the memory 13 after reduction can be made match the new intervals of information accumulated in the memory 13. Accordingly, the memory management unit 14 may delete the information in the memory 13 such that these intervals match each other. For example, the memory management unit 14 may reduce the information such that, when the information stored in the memory 13 is arranged in time series, a predetermined one out of every N pieces of information remains. With this processing, the information stored in the memory 13 is substantially the same as a result of down-sampling. For example, if N=2, every other piece of information may be deleted when the information stored in the memory 13 is arranged in time series.

Figure 3:
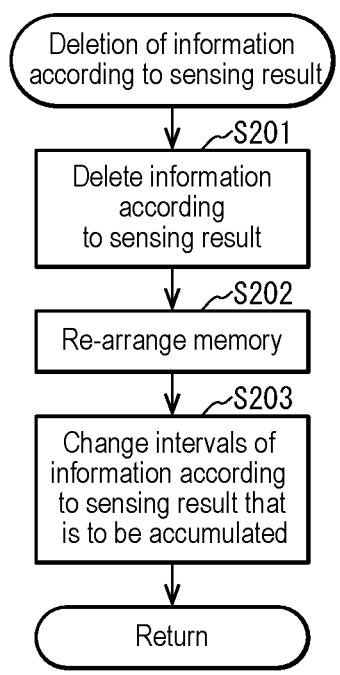
FIG. 3 is a flowchart showing an example of processing of deleting information in a memory according to the embodiment.

Next, the processing that deletes the information (Step S104) in the flowchart in FIG. 2 will be described in detail with reference to the flowchart in FIG. 3.

(Step S201) The memory management unit 14 deletes the information according to the sensing result stored in the memory 13. This deletion may be performed, for example, by setting the information according to the sensing result stored in the memory 13 to 1/N.

(Step S202) The memory management unit 14 re-arranges the information stored in the memory 13. This processing will be described later.

(Step S203) The memory management unit 14 changes the intervals of the information according to the sensing result that is to be accumulated, to be longer than the current intervals. The procedure then returns to the flowchart in FIG. 2. This change may be made, for example, by making the intervals of the information that is to be accumulated, to N times. The intervals after the change may be delivered to the accepting unit 12. Then, the accepting unit 12 may perform accumulation of information according to the new intervals.

Hereinafter, the processing that deletes the information according to the sensing result shown in the flowchart in FIG. 3 will be specifically described with reference to FIG. 4. It is assumed that, in this specific example, in a case in which the memory 13 is running short of free space, the memory management unit 14 reduces the information according to the sensing result stored in the memory 13 to ½, and doubles the length of the intervals for accumulating the information according to the sensing result in the memory 13. FIG. 4 is a diagram illustrating a state in which information is stored in the memory 13. In this example, for the sake of ease of description, it is assumed that ten pieces of information according to the sensing result can be stored in the memory 13. In the memory 13, an area in which information is not stored is indicated by a rectangle with a white inner portion and an area in which information is stored is indicated by a black rectangle.

A state 1 is a state of the memory 13 before the robot control apparatus 1 starts a tracking operation. In this case, information is not stored in the areas of the memory 13, and the number of pieces of information that can be stored is ten.

Next, it is assumed that the laser sensor 5 starts sensing, and the accepting unit 12 sequentially accumulates information according to the sensing result in the memory 13. A state 2 is a state in which ten pieces of information are stored in this manner in the memory 13. In this case, the number of pieces of information that can be stored in the memory 13 is 0.

Subsequently, if a new sensing result is accepted and information according to the sensing result is acquired before the control unit 15 reads and deletes the information in the memory 13 (Steps S101 and S102), the memory management unit 14 judges that there is no more free space in the memory 13 (Step S103), and performs processing that deletes the information according to the sensing result (Step S104).

Specifically, first, the memory management unit 14 reduces the information according to the sensing result stored in the memory 13 to ½ as shown in a state 3 (Step S201). It is assumed that, in the reduction, the memory management unit 14 deletes every other piece of information such that the length of the intervals of remaining information is doubled. As a result, the number of pieces of information that can be stored is increased to five. In FIG. 4, it is assumed that information is sequentially stored in time series from the left.

Subsequently, as shown in a state 4, the memory management unit 14 re-arranges the information stored in the memory 13 such that the pieces of information are gathered into one unit (Step S202). The memory management unit 14 changes the intervals of the information according to the sensing result that is to be accumulated, at that point in time, such that the length thereof is doubled, and delivers the intervals after the change to the accepting unit 12 (Step S203). Since the free space in the memory 13 is secured in this manner, it is possible for the accepting unit 12 to accumulate the information that is to be accumulated, in the memory 13, as shown in a state 5 in FIG. 4 (Step S105).

In a case in which there is again no more free space in the memory 13, the processing that reduces the information in the memory 13 and makes the intervals of the information that is to be accumulated longer is performed. In this manner, the processing that reduces the information in the memory 13 and makes the intervals of the information that is to be accumulated longer is repeated until the capacity of the memory 13 is ultimately no more insufficient. After the series of tracking operations are ended, the intervals for accumulating information in the memory 13 may be reset.

Case (2) in which the Information Associated with the Highest Dispersion Level is Deleted In this case, the memory management unit 14 deletes information according to a sensing result associated with the highest dispersion level, out of the information according to sensing results stored in the memory 13. In this example, first, acquisition of a dispersion level will be described.

Figure 6:
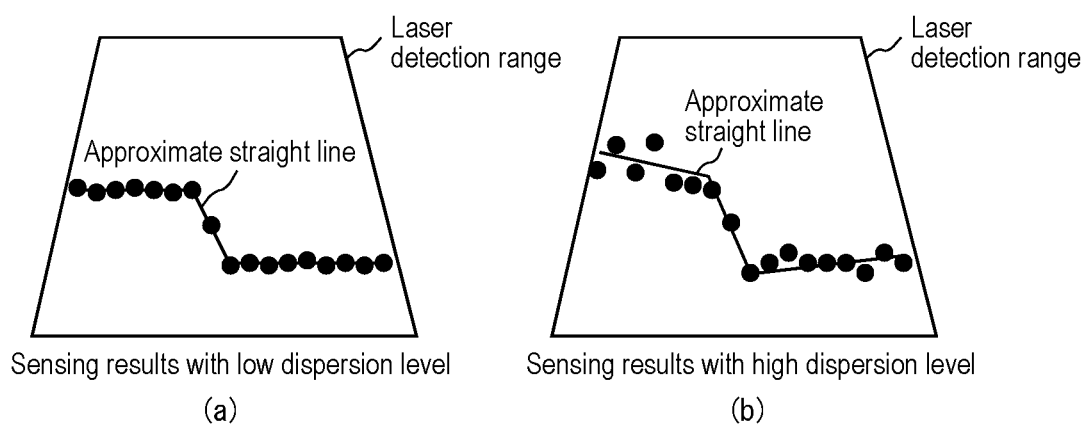
FIGS. 6(a) and 6(b) are diagrams illustrating dispersion levels according to the embodiment.

The dispersion level is information indicating the level of dispersion of differences between the shape of the working target 6 estimated based on the sensing result of the laser sensor 5, and the sensing result. FIGS. 6(a) and 6(b) are diagrams illustrating a sensing result, and a shape estimated based on the sensing result, in a case in which the working target 6 is a lap joint. In FIGS. 6(a) and 6(b), a sensing result within a laser scanning range of the laser sensor 5 is indicated by a black circle, and a shape estimated based on the sensing result is indicated by an approximate straight line. FIG. 6(a) shows sensing results with a low dispersion level, and FIG. 6(b) shows sensing results with a high dispersion level.

Upon accepting a sensing result shown in FIG. 6(a) or 6(b) or the like, first, the accepting unit 12 estimates an approximate straight line based on the sensing result, and acquires a difference between the estimated approximate straight line and each sensing result. The difference may be a distance from a black circle, which is the sensing result, to the approximate straight line. That is to say, the difference may be a residual error. It is assumed that the difference is a real number of 0 or more. Subsequently, the accepting unit 12 acquires a dispersion level indicating a level of dispersion of the differences. Specifically, the accepting unit 12 may acquire a dispersion level that is a variance of the differences, may acquire a dispersion level that is a standard deviation of the differences, or may acquire another types of dispersion level indicating a level of dispersion of the differences. In this manner, the accepting unit 12 can acquire a dispersion level according to the sensing results. In FIG. 6(a), dispersion of the sensing results is small, and the dispersion level has a little value. Thus, it seems that the level of precision of the information according to the sensing results is higher. On the other hand, in FIG. 6(b), dispersion of the sensing results is large due to the influence of sputtering or the like, and the dispersion level has a large value. Since the shape of the working target 6 is not estimated as appropriate, it seems that the level of precision of the information according to the sensing results is lower. Accordingly, when deleting the information stored in the memory 13, it is possible to delete information with a low level of precision and hold information with a high level of precision, by deleting the information with the highest dispersion level.

Figure 5:
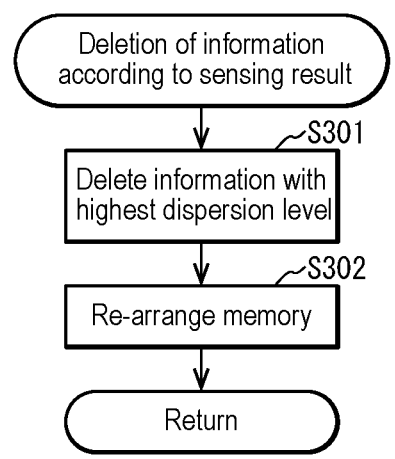
FIG. 5 is a flowchart showing an example of the processing of deleting information in the memory according to the embodiment.

Next, the processing that deletes the information (Step S104) in the flowchart in FIG. 2 will be described in detail with reference to the flowchart in FIG. 5. In this case, it is assumed that, in step S102 of the flowchart in FIG. 2, a dispersion level regarding sensing results is also calculated together with information according to the sensing results, and, in step S105, the information according to the sensing results and the dispersion level are accumulated in association with each other.

(Step S301) The memory management unit 14 deletes the information with the highest dispersion level, out of the information according to sensing results stored in the memory 13. More specifically, the memory management unit 14 specifies a highest dispersion level stored in the memory 13, and deletes information according to the sensing result associated with the dispersion level.

(Step S302) The memory management unit 14 re-arranges the information stored in the memory 13. The procedure then returns to the flowchart in FIG. 2.

Hereinafter, the processing that deletes the information according to the sensing result shown in the flowchart in FIG. 5 will be specifically described with reference to FIG. 7. In FIG. 7, the method for indicating the state of the memory is similar to that in FIG. 4.

A state 1 is a state of the memory 13 before the robot control apparatus 1 starts a tracking operation. In this case, information is not stored in the areas of the memory 13, and the number of pieces of information that can be stored is ten.

Next, it is assumed that the laser sensor 5 starts sensing, and the accepting unit 12 sequentially accumulates information according to the sensing result in the memory 13. A state 2 is a state in which ten pieces of information are stored in this manner in the memory 13. In this case, the number of pieces of information that can be stored in the memory 13 is 0. The numerical values displayed below the stored information (indicated by black rectangles) are dispersion levels associated with the information. In the state 2, the dispersion level of the fifth piece of information from the left is highest.

Subsequently, if a new sensing result is accepted and information according to the sensing result is acquired before the control unit 15 reads and deletes the information in the memory 13 (Steps S101 and S102), the memory management unit 14 judges that there is no more free space in the memory 13 (Step S103), and performs processing that deletes the information according to the sensing result (Step S104).

Specifically, the memory management unit 14 specifies a highest dispersion level "99" in the state 2, and deletes the information associated with the highest dispersion level (Step S301). It is assumed that, when the information is deleted, the dispersion level is also deleted. As a result, the memory 13 is as shown in a state 3, and the number of pieces of information that can be stored is incremented by 1.

Subsequently, as shown in a state 4, the memory management unit 14 re-arranges the information stored in the memory 13 such that the pieces of information are gathered into one unit (Step S302). Since the free space in the memory 13 is secured in this manner, it is possible for the accepting unit 12 to accumulate the information that is to be accumulated, in the memory 13, as shown in a state 5 in FIG. 7 (Step S105). In a case in which there is again no more free space in the memory 13, the processing that deletes the information associated with the highest dispersion level in the memory 13 is performed.

As described above, with the robot control apparatus 1 according to this embodiment, it is possible to prevent a situation in which information according to a sensing result cannot be accumulated in the memory 13, by deleting information according to a sensing result stored in the memory 13. With the processing that deletes the information in the memory 13 and makes the intervals for accumulating the information according to the sensing result in the memory 13 longer, accumulation of information in the memory 13 and reading of the information from the memory 13 are balanced, and thus it is possible to eliminate a cause that makes the capacity of the memory 13 insufficient. If dispersion levels are accumulated in association with the information according to the sensing results, it is possible to delete information with a low level of precision, by deleting information with a high dispersion level. Accordingly, even in the case in which information is deleted from the memory 13, information with a high level of precision can be maintained, and thus it is possible to prevent the level of precision of the tracking operation from being lowered. Also, it seems that there may be cases in which the level of precision of the tracking operation can be improved by deleting information with a low level of precision.

In the foregoing embodiment, the case was described in which down-sampling of sensing results accepted by the accepting unit 12 from the laser sensor 5 is performed when the imaging intervals of the laser sensor 5 and the intervals at which the accepting unit 12 accumulates information in the memory 13 do not match each other, but there is no limitation to this. If the imaging intervals can be changed, the laser sensor 5 may perform sensing at the intervals at which information is accumulated in the memory 13. In this case, the accepting unit 12 may use sensing results accepted from the laser sensor 5 as they are without performing down-sampling.

Furthermore, in the foregoing embodiment, the case was described in which the tracking operation is welding, but it is also possible that the tracking operation is an operation other than welding. There is no particular limitation on the tracking operation other than welding, and examples thereof include seam tracking operations such as sealing and deburring. If the tracking operation is sealing, the working tool may be a sealing gun (caulking gun) or the like. If the tracking operation is deburring, the working tool may be a deburring unit or the like. If the tracking operation is not welding, the robot control system 100 need not include the welding power source 3.

Furthermore, in the foregoing embodiment, each process or each function may be realized as centralized processing using a single apparatus, or may be realized as distributed processing using multiple apparatuses.

Furthermore, in the foregoing embodiment, information transmission performed between constituent elements may be such that, for example, if two constituent elements for transmitting information are physically different from each other, the transmission is performed by one of the constituent elements outputting the information and the other constituent element accepting the information, or alternatively, if two constituent elements for transmitting information are physically the same, the transmission is performed by shifting from a processing phase corresponding to one of the constituent elements to a processing phase corresponding to the other constituent element.

Furthermore, in the foregoing embodiment, information related to the processing that is performed by each constituent element, for example, information that is to be accepted, acquired, selected, generated, transmitted, or received by each constituent element, information such as a threshold value, a numerical expression, or an address used by each constituent element in the processing and the like may be retained in an unshown storage medium temporarily or for a long period of time even if not specified in the description above. Furthermore, the information may be accumulated in the unshown storage medium by each constituent element or by an unshown accumulating unit. Furthermore, the information may be read from the unshown storage medium by each constituent element or by an unshown reading unit.

Furthermore, in the foregoing embodiment, if information used in each constituent element or the like, for example, information such as a threshold value, an address, or various setting values used in each constituent element in the processing may be changed by a user, and the user may be or may not be allowed to change such information as appropriate even if not specified in the description above. If the user is allowed to change such information, the change may be realized by, for example, an unshown accepting unit that accepts a change instruction from the user and an unshown changing unit that changes information according to the change instruction. The change instruction may be accepted by the unshown accepting unit, for example, by accepting information from an input device, by receiving information transmitted via a communication line, or by accepting information read from a predetermined storage medium.

Furthermore, in the foregoing embodiment, if two or more constituent elements included in the robot control apparatus 1 have a communication device, an input device, or the like, the two or more constituent elements may have a physically single device, or may have different devices.

Furthermore, in the foregoing embodiment, each constituent element may be configured by dedicated hardware, or alternatively, constituent elements that can be realized by software may be realized by executing a program. For example, each constituent element may be realized by a program execution unit such as a CPU reading and executing a software program stored in a storage medium such as a hard disk or a semiconductor memory. At the time of executing the program, the program execution unit may execute the program while accessing the storage unit or the storage medium. Furthermore, this program may be executed by downloading from a server or the like, or may be executed by reading a program stored in a predetermined storage medium (e.g., an optical disk, a magnetic disk, a semiconductor memory, etc.). Furthermore, the program may be used as a program forming a program product. Furthermore, a computer that executes the program may be a single computer or may be multiple computers. That is to say, centralized processing may be performed, or distributed processing may be performed.

The present invention is not limited to the embodiment set forth herein. Various modifications are possible within the scope of the invention.

As described above, the robot control apparatus and the like according to the present invention has the effect of making it possible to prevent a situation in which information according to a sensing result cannot be accumulated in a memory in a tracking operation, and thus this apparatus is useful as a robot control apparatus and the like for performing control regarding a tracking operation.

What is claimed is:

1. A robot control apparatus comprising:
a storage unit in which teaching data is stored;
a memory;
an accepting unit that accepts a sensing result of a laser sensor, from a robot including a working tool and the laser sensor configured to detect a shape of a working target before an operation of the working tool, and accumulates information according to the sensing result, in the memory;
a memory management unit that, in a case in which the memory is running short of free space, deletes the information according to the sensing result stored in the memory; and
a control unit that moves the working tool based on the teaching data, and corrects the movement of the working tool based on the information according to the sensing result stored in the memory.

2. The robot control apparatus according to claim 1, wherein, in a case in which the memory is running short of free space, the memory management unit reduces the information according to the sensing result stored in the memory and makes intervals for accumulating the information according to the sensing result in the memory longer.

3. The robot control apparatus according to claim 2, wherein, in a case in which the memory is running short of free space, the memory management unit reduces the information according to the sensing result stored in the memory to ½, and doubles a length of the intervals for accumulating the information according to the sensing result in the memory.

4. The robot control apparatus according to claim 1, wherein the accepting unit accumulates a dispersion level indicating a level of dispersion of differences between a shape of the working target estimated based on the sensing result, and the sensing result, in the memory in association with the information according to the sensing result, and
in a case in which the memory is running short of free space, the memory management unit deletes information according to a sensing result associated with a highest dispersion level, out of the information according to sensing results stored in the memory.

5. A robot control system comprising:
the robot control apparatus according to claim 1; and
the robot that is controlled by the robot control apparatus.

* * * * *